US009344550B2

(12) United States Patent
Lim et al.

(10) Patent No.: US 9,344,550 B2
(45) Date of Patent: May 17, 2016

(54) APPARATUS AND METHOD FOR SETTING UP AN INTERFACE IN A MOBILE TERMINAL

(71) Applicant: Samsung Electronics Co., Ltd., Gyeonggi-do (KR)

(72) Inventors: Chae-Whan Lim, Daegu (KR); Hyun-Soo Kim, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/601,670

(22) Filed: Jan. 21, 2015

(65) Prior Publication Data
US 2015/0133104 A1 May 14, 2015

Related U.S. Application Data

(63) Continuation of application No. 13/735,347, filed on Jan. 7, 2013, now Pat. No. 8,954,112.

(30) Foreign Application Priority Data

Jan. 16, 2012 (KR) ........................ 10-2012-0004887

(51) Int. Cl.
H04M 1/00 (2006.01)
H04M 1/725 (2006.01)
(Continued)

(52) U.S. Cl.
CPC ......... H04M 1/72572 (2013.01); G06F 9/4448 (2013.01); H04M 1/72519 (2013.01); H04W 4/021 (2013.01); H04W 8/183 (2013.01)

(58) Field of Classification Search
CPC ....... H04W 8/183; H04W 8/12; H04W 48/18; H04W 92/02; H04W 88/06; H04W 48/16; H04W 60/00; H04W 60/04; H04W 8/245; H04W 76/005; H04W 4/10; H04L 29/08072; G06F 9/4401
USPC .............. 455/32.1, 432.2, 432.3, 434, 435.1, 455/435.2, 435.3, 518, 418, 558.4, 419, 455/551, 552.1; 713/1, 2, 100; 709/219, 709/220
See application file for complete search history.

(56) References Cited

U.S. PATENT DOCUMENTS 6,496,979 B1 12/2002 Chen et al.
8,494,486 B2 * 7/2013 Roundtree .................... 455/410
(Continued)

FOREIGN PATENT DOCUMENTS

EP 1 513 358 A1 3/2005
WO 00/36862 A1 6/2000
(Continued)

Primary Examiner — Amancio Gonzalez
(74) Attorney, Agent, or Firm — Cha & Reiter, LLC

(57) ABSTRACT

An apparatus and method set up an interface in a mobile terminal. The method includes: storing an interface setup application including customized data unique to countries and operators; determining whether a Subscriber Identity Module (SIM) card is inserted into the mobile terminal when the mobile terminal is powered on; detecting a Mobile Country Code (MCC) and a Mobile Network Code (MNC) included in the SIM card, if the SIM card is inserted into the mobile terminal; executing the interface setup application and searching for customized data corresponding to the detected MCC and MNC from among the customized data unique to countries and operators; and installing an interface of the mobile terminal based on the searched customized data.

22 Claims, 2 Drawing Sheets

(51) Int. Cl.
*G06F 9/44* (2006.01)
*H04W 8/18* (2009.01)
*H04W 4/02* (2009.01)

(56) References Cited

U.S. PATENT DOCUMENTS

| | | |
|---|---|---|
| 2001/0001875 A1 | 5/2001 | Hirsch |
| 2006/0074629 A1 | 4/2006 | Chiu et al. |
| 2007/0015538 A1 | 1/2007 | Wang |
| 2007/0197216 A1* | 8/2007 | Wang .................... H04W 48/02 455/433 |
| 2008/0293395 A1* | 11/2008 | Mathews et al. .............. 455/418 |
| 2010/0075648 A1 | 3/2010 | Matsuoka et al. |
| 2011/0087757 A1 | 4/2011 | Paalanen et al. |

FOREIGN PATENT DOCUMENTS

| | | |
|---|---|---|
| WO | 2007/063414 A2 | 6/2007 |
| WO | 2009/090488 A2 | 7/2009 |

* cited by examiner

APPARATUS AND METHOD FOR SETTING UP AN INTERFACE IN A MOBILE TERMINAL

CLAIM OF PRIORITY

This application is a Continuation of U.S. patent application Ser. No. 13/735,347 filed on Jan. 7, 2013 which claims, pursuant to 35 U.S.C. §119(a), priority to and the benefit of the earlier filing date of a Korean Patent Application filed in the Korean Intellectual Property Office on Jan. 16, 2012 and assigned Serial No. 10-2012-0004887, the entire disclosure of which is incorporated herein by reference.

BACKGROUND

1. Field of the Invention

The present invention relates generally to a mobile terminal, and more particularly, to an apparatus and method for setting up an interface in a mobile terminal.

2. Description of the Related Art

In general, different communication service providers, also known as operators, require different interfaces for mobile terminals. To provide the required interfaces, mobile terminal manufacturers set up different interfaces unique to each of or to groups of countries/operators, in mobile terminals. Setting up different interfaces unique to each of or to groups of countries/operators in mobile terminals is referred to as "localization of mobile terminals".

For the localization of mobile terminals, the mobile terminal manufacturers may depend on one or both of the following two approaches.

In a first approach, mobile terminal manufacturers may create different dedicated software unique to each of or to groups of countries/operators, may sort mobile terminals depending on the countries/operators in which or by which their service will be provided, and may install the dedicated software in its associated mobile terminals.

In a second approach, the mobile terminal manufacturers may create customized software including customized data, to which requirements of each of or groups of countries/operators are applied, and store the customized software in its associated mobile terminals, thereby installing customized data corresponding to a specific country/operator in its associated mobile terminals.

However, the first approach causes the mobile terminal manufacturers to annoyingly create different dedicated software for different markets. Furthermore, in the first approach, the mobile terminals in which the dedicated software unique to a specific country/operator is installed may not be supported in or by other countries/operators.

The second approach causes the mobile terminal manufacturers to annoyingly newly create customized software if an error occurs in its customized data for a specific country/operator. Moreover, in the second approach, the high-capacity customized software remains in a memory even after its interface is set up, thereby decreasing memory utilization of the mobile terminals. Besides, an interface of mobile terminals is set up in the mobile terminals based on the customized data for a specific country/operator in the manufacturing process, so the mobile terminals may not be supported in or by other countries/operators.

Therefore, a solution to these problems is needed.

SUMMARY

An aspect of an exemplary embodiment of the present invention is to provide an apparatus and method for setting up an interface in a mobile terminal without the need to create different versions of dedicated software.

Another aspect of an exemplary embodiment of the present invention is to provide an apparatus and method for setting up an interface in a mobile terminal without the need to newly create customized software.

Another aspect of an exemplary embodiment of the present invention is to provide an apparatus and method for setting up an interface in a mobile terminal, adapted to increase memory utilization of the mobile terminal.

Another aspect of an exemplary embodiment of the present invention is to provide an apparatus and method for setting up an interface in a mobile terminal so that the mobile terminal may be supported in or by other countries/operators even though an interface for a specific country/operator is set up in the mobile terminal.

In accordance with one aspect of the present invention, there is provided an apparatus for setting up an interface in a mobile terminal. The apparatus includes: a memory unit for storing an interface setup application including customized data unique to countries and operators; and a controller for determining whether a Subscriber Identity Module (SIM) card is inserted into the mobile terminal when the mobile terminal is powered on, and if the SIM card is inserted into the mobile terminal, detecting a Mobile Country Code (MCC) and a Mobile Network Code (MNC) included in the SIM card, executing the interface setup application, searching for customized data corresponding to the detected MCC and MNC from among the customized data unique to countries and operators, and installing an interface of the mobile terminal based on the searched customized data.

In accordance with another aspect of the present invention, there is provided a method for setting up an interface in a mobile terminal. The method includes: storing an interface setup application including customized data unique to countries and operators; determining whether a Subscriber Identity Module (SIM) card is inserted into the mobile terminal when the mobile terminal is powered on; detecting a Mobile Country Code (MCC) and a Mobile Network Code (MNC) included in the SIM card, if it is determined that the SIM card is inserted into the mobile terminal; executing the interface setup application and searching for customized data corresponding to the detected MCC and MNC from among the customized data unique to countries and operators; and installing an interface of the mobile terminal based on the searched customized data.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION

Figure 1:
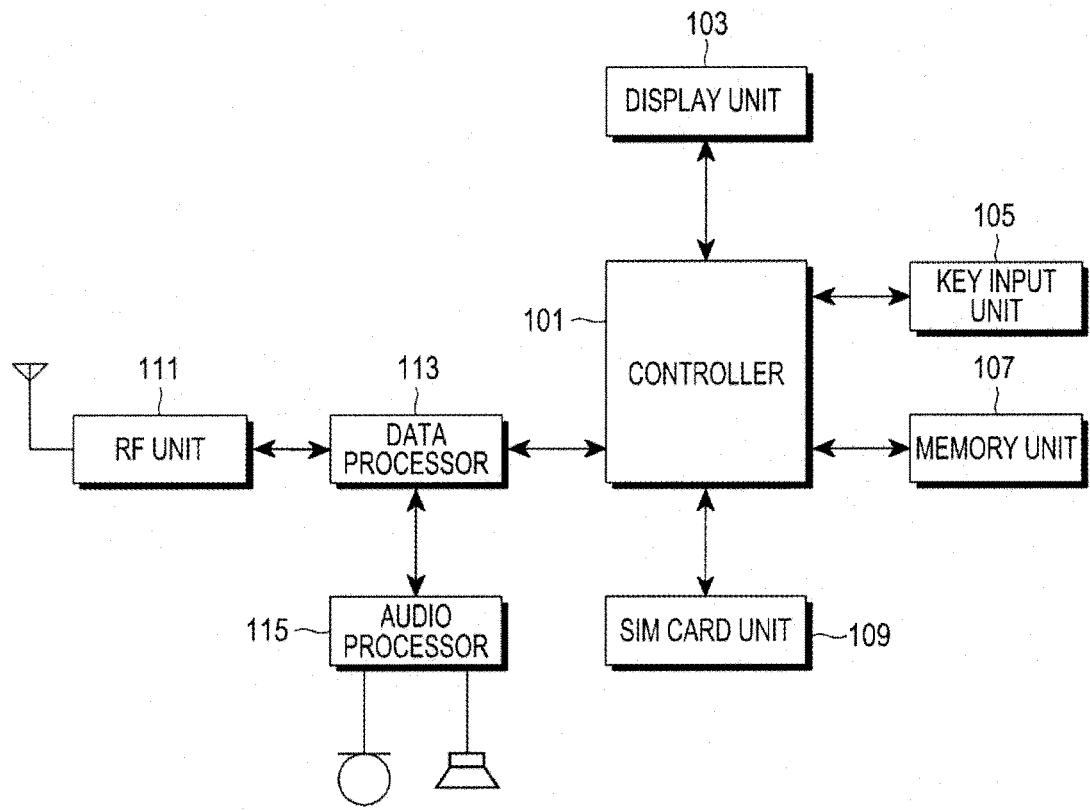
FIG. 1 illustrates a structure of a mobile terminal according to an exemplary embodiment of the present invention.

Exemplary embodiments of the present invention will now be described in detail with reference to the accompanying drawings. In the following description, well-known functions or constructions are not described in detail since they would obscure the invention with unnecessary detail. The present invention may, however, be embodied in many different forms and should not be construed as limited to the exemplary embodiments set forth herein. Also, terms described herein, which are defined considering the functions of the present invention, may be implemented differently depending on user and operator's intention and practice. Therefore, the terms should be understood on the basis of the disclosure throughout the specification. The principles and features of this invention may be employed in varied and numerous embodiments without departing from the scope of the invention.

The same reference numbers are used throughout the drawings to refer to the same or like parts. Furthermore, although the drawings represent exemplary embodiments of the invention, the drawings are not necessarily to scale and certain features may be exaggerated or omitted in order to more clearly illustrate and explain the present invention.

Among the terms set forth herein, a terminal refers to any kind of device capable of processing data which is transmitted or received to or from any external entity. The terminal may display icons or menus on a screen to which stored data and various executable functions are assigned or mapped. The terminal may include a computer, a notebook, a tablet PC, a mobile device, and the like.

Among the terms set forth herein, a screen refers to a display or other output devices which visually display information to the user, and which optionally are capable of receiving and electronically processing tactile inputs from a user using a stylo, a finger of the user, or other techniques for conveying a user selection from the user to the output devices.

Among terms set forth herein, data refers to any kind of information processed by the device, including text and/or images received from any external entities, messages transmitted or received, and information created when a specific function is executed by the device.

Among terms set forth herein, an operator refers to a service provider, such as a telecommunications service, an Internet service, a network connectivity service, or any known systems and services for providing communications.

A mobile terminal according to an exemplary embodiment of the present invention is a mobile electronic device that its user may easily carry with him or her, such as a videophone, a mobile phone, a smart phone, an International Mobile Telecommunication 2000 (IMT-2000) terminal, a Wideband Code Division Multiple Access (WCDMA) terminal, a Universal Mobile Telecommunications System (UMTS) terminal, a Personal Digital Assistant (PDA), a Portable Multimedia Player (PMP), a Digital Multimedia Broadcasting (DMB) terminal, an E-Book, a portable computer (e.g., a laptop computer and a tablet PC), or a digital camera.

FIG. 1 shows a structure of a mobile terminal according to the exemplary embodiment of the present invention.

Referring to FIG. 1, the mobile terminal includes a controller 101, a display unit 103, a key input unit 105, a memory unit 107, a Subscriber Identity Module (SIM) card unit 109, a Radio Frequency (RF) unit 111, a data processor 113, and an audio processor 115.

The RF unit 111 is responsible for wireless communication of the mobile terminal. The RF unit 111 includes an RF transmitter for up-converting a frequency of transmission signals and amplifying the up-converted transmission signals, and an RF receiver for low-noise-amplifying received signals and down-converting a frequency of the amplified received signals. The data processor 113 includes a transmitter for coding and modulating the transmission signals, and a receiver for demodulating and decoding the received signals.

In other words, the data processor 113 may include a modulator/demodulator (modem) and a coder/decoder (codec). The codec includes a data codec for processing data signals such as packet data, and an audio codec for processing audio signals such as voice.

The audio processor 115 plays received audio signals output from the data processor 113 by outputting corresponding sounds, such as voice audio, from a speaker, and transfers transmission audio signals picked up by a microphone, such as sound including a voice, to the data processor 113. The key input unit 105 includes alphanumeric keys for inputting alphanumeric information or other characters and symbols, and function keys for setting various functions. The display unit 103 displays images on a screen and displays output data requested by the controller 101.

When the display unit 103 is implemented to have a capacitive or resistive touch screen, the key input unit 105 may include only the minimum number of preset keys. In this case, the display unit 103 may replace some of the key input functions of the key input unit 105.

The memory unit 107 may include a program memory and a data memory. The program memory may store booting programs and an Operating System (OS) for controlling a general operation of the mobile terminal, and the data memory may store the data generated during an operation of the mobile terminal. In particular, the memory unit 107 stores a predetermined application for setting up an interface of the mobile terminal, with the stored application hereinafter, referred to as an "interface setup application".

The memory unit 107 may include a code area, a data area, a stack area, and a heap area. The code area is an area for storing codes or programs such as the interface setup application or other executable code, the data area is an area for storing data which, for example, is not deleted until its related program ends, the stack area is an area for storing volatile data, and the heap area is an area for storing data desired, customized, or selected by a user. Preferably, the interface setup application may be stored in a specific area (e.g., the data area or the code area) of the memory unit 107.

Figure 2:
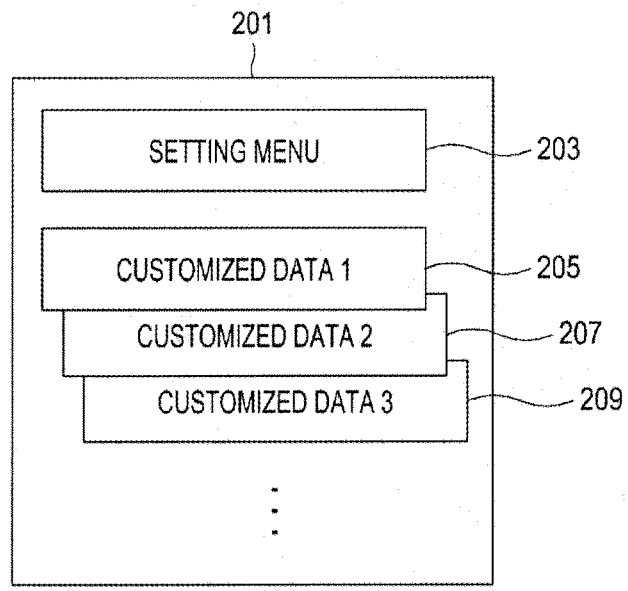
FIG. 2 illustrates a configuration of an interface setup application according to the exemplary embodiment of the present invention.

FIG. 2 shows a configuration of an interface setup application 201 according to the exemplary embodiment of the present invention. The interface setup application 201 is predetermined software and/or firmware written, for example, in the C++ programming language or other known high-level programming languages, or alternatively in objected-oriented programming languages, for applying associated settings data stored in the memory unit 107 and/or a SIM card present in the SIM card unit 109 to install, configure, and set up an interface for the mobile terminal in a manner known in the art.

Referring to FIG. 2, the interface setup application 201 includes a setting menu 203 and customized data 205, 207, and 209, in which the first customized data 205 is labeled "customized data 1", the second customized data 207 is labeled "customized data 2", and the third customized data 209 is labeled "customized data 3". The interface setup application 201 may include customized data for all countries and operators, as well as for regions within countries and international entities, so that an interface required by a specific operator in a specific country or region may be installed in the mobile terminal. The interface setup application 201 may be encrypted for security. An operator is a communication service provider in a specific country or region, e.g., SK TELECOM®, KTF®, or LG TELECOM®.

Each of the customized data 205, 207, and 209 includes interface setup information corresponding to a specific Mobile Country Code (MCC) and a specific Mobile Network Code (MNC). The interface setup information may include an Access Point Name (APN) profile, e-mail setting information, bookmark information, a homepage address, power-on/off images, a wallpaper, a ringtone, applications, menu setting information, widgets, network lock setting information, and function enabling setting information.

The APN profile includes a character string indicating a target, which is required to connect a mobile terminal and the like to a mobile network, for data or voice communication. The e-mail setting information includes setting information which a mobile terminal uses to perform an e-mail function. The bookmark information includes web site addresses required by or selected by a specific operator. The homepage address includes a homepage address for the specific operator. The power-on/off images represent images required by or selected by the specific operator, which are to be displayed when the mobile terminal is powered on or off. The wallpaper represents a background image required by or selected by the specific operator. The mobile terminal may also provide default or customizable values and information as well as a sample selection for such settings, web site addresses, bookmark information, homepage addresses, power-on/off images, and wallpaper.

The ringtone represents a call connection sound required by or selected the specific operator. The applications include applications required by, selected by, or installed by the specific operator. The menu setting information represents information for setting a menu of the mobile terminal as a menu required by or selected by the specific operator. The widgets represent widgets required by or selected by the specific operator. The network lock setting information represents information for setting a network lock by the specific operator and includes a Network Code Key (NCK). The function enabling setting information represents information for enabling a function required by or selected by the specific operator from among a plurality of functions available in the mobile terminal.

Optionally, at least one of the customized data 205, 207, and 209 may include setup-related link information.

The setup-related link information may include link information by which some specific customized data can be received, so that the customized data 205, 207, and 209 does not to exceed the capacity of the memory unit 107 in the mobile terminal. Instead, the setup-related link information may include link information for a specific or a regular update of the specific customized data.

For example, if a capacity of the first customized data 205 exceeds 20 megabytes (MB), the interface setup information of the first customized data 205 may include link information by which any further data to be stored as the first customized data 205 can be received as remaining customized data, except for pre-stored first customized data 205. In particular, the remaining customized data, associated with the first customized data 205, may be applications or wallpapers.

As another example, if the interface setup information must be updated due to an error in the first customized data 205, the interface setup information of the first customized data 205 may be configured to include link information by which new first customized data 205 can be received.

The setting menu 203 includes at least one of a SIM card setting mode, a network setting mode, and a user setting mode to install an interface in the mobile terminal to be displayed by the display unit 103 of the mobile terminal, in that the interface is required for use in a specific country or region, and for use by a specific operator.

The SIM card setting mode is a mode for searching for related customized data from among all pre-designated customized data based on a specific MCC and a specific MNC that are stored in a SIM card, and for setting up an interface of the mobile terminal based on the searched customized data. The network setting mode is a mode for requesting and receiving a specific MCC and a specific MNC from a pre-defined server, searching for related customized data from among all pre-designated customized data based on the received specific MCC and specific MNC, and setting up an interface of the mobile terminal based on the searched customized data, when the specific MCC and the specific MNC cannot be acquired in the SIM card setting mode.

The user setting mode is a mode for requesting the user to input a specific MCC and a specific MNC through the key input unit 105 and/or on the display unit 103 having a touch screen, and if the user inputs the specific MCC and the specific MNC, searching for related customized data from among all pre-designated customized data based on the input specific MCC and specific MNC, and setting up an interface of the mobile terminal based on the searched customized data, when the specific MCC and the specific MNC cannot be acquired in either the SIM card setting mode or the network setting mode.

The SIM card unit 109 transfers information included in the SIM card to the controller 101 when the SIM card is inserted into the mobile terminal; for example, inserted into a dock, port, or slot of the SIM card unit 109. The SIM card is detachable from the SIM card unit 109 and includes subscriber information. In particular, the subscriber information includes an MCC and an MNC. The MCC represents a code of a country or region in which the user of the mobile terminal is located, and the MNC represents a code of an operator providing communication services for the mobile terminal. The MCC has a value unique to a certain country or region, and the MNC also has a value unique to a certain operator.

For example, when the user receives or enjoys a communication service provided by SK TELECOM® in South Korea, the MCC and the MNC may be set as "450" and "05", respectively.

The controller 101 controls the overall operation of the mobile terminal. In particular, the controller 101 searches for customized data suitable for the mobile terminal by applying the MCC and the MNC of the mobile terminal to an interface setup application, and sets up an interface based on the searched customized data.

Figure 3:
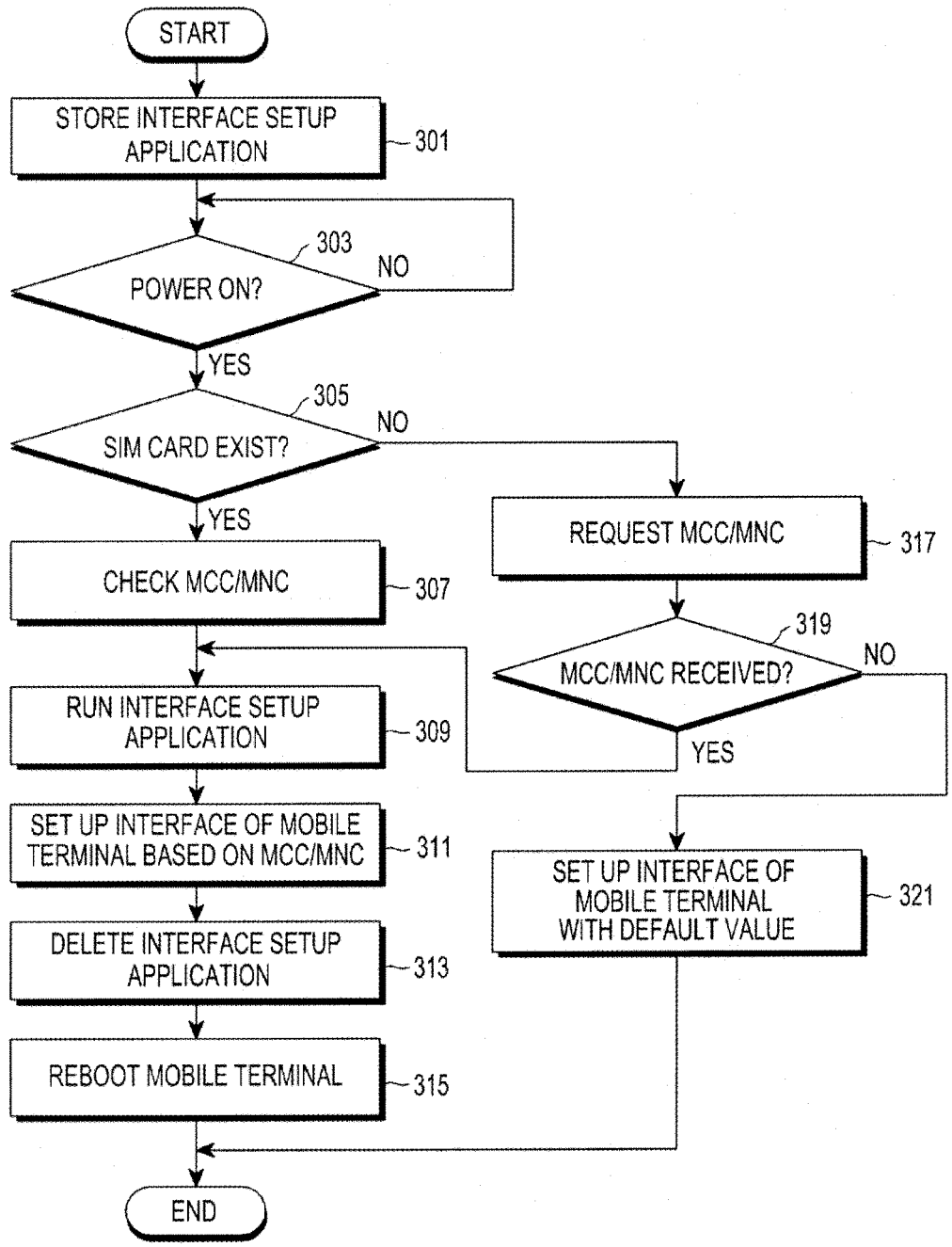
FIG. 3 illustrates a process of setting up an interface in a mobile terminal according to the exemplary embodiment of the present invention.

More specifically, referring to FIG. 3, the controller 101 pre-stores the interface setup application in step 301 in the memory unit 107, and in particular, stored in a specific area of the memory unit 107 as described herein. When the mobile terminal is powered on as detected in step 303, the controller 101 determines or detects whether a SIM card is in the SIM card unit 109 in step 305.

If a SIM card is present, the controller 101 checks an MCC and an MNC that would be stored in the SIM card, and automatically runs the interface setup application in step 307.

After executing or running the interface setup application in step 309, the controller 101 searches for customized data corresponding to the checked MCC and MNC from among a plurality of pieces of customized data and sets up an interface of the mobile terminal in step 311 based on the searched customized data.

In this case, the controller 101 sets a data communication function, an e-mail function, a network setup function of the mobile terminal, and other functions provided by the mobile terminal as required by or selected by a specific operator based on an APN profile, e-mail setting information, network lock setting information, and function enabling setting information that are included in the searched customized data. In addition, the controller 101 updates and stores content of the mobile terminal as required by or selected by the specific operator based on bookmark information, a homepage address, power-on/off images, a wallpaper, a ringtone, applications, menu setting information, and widgets that are included in the searched customized data.

If setup-related link information is included in the searched customized data, the controller 101 may access an external server based on the link information to receive any remaining customized data from the external server, and may set up an interface of the mobile terminal based on the searched customized data and the received remaining customized data. In addition, the controller 101 may access the external server based on the link information to update the interface setup application.

Thereafter, the controller 101 ends and optionally deletes the running interface setup application in step 313, and optionally reboots the mobile terminal in step 315, as described in more detail herein.

In the absence of the SIM card as detected in step 305, the controller 101 sends a request message in step 317, for requesting an MCC and an MNC for the mobile terminal, to the external server over an external network. This request message may include a Media Access Control (MAC) address of the mobile terminal. In response to the request message, the controller 101 determines whether an MCC and an MNC are received in step 319.

If an MCC and an MNC are received, the controller 101 executes the interface setup application in step 309, searches for customized data corresponding to the received MCC and MNC from among the plurality of pieces of customized data, and sets up an interface of the mobile terminal based on the searched customized data in step 311. Thereafter, the controller 101 deletes the interface setup application in step 313 and reboots the mobile terminal in step 315, for example, to implement the set up interface.

If neither an MCC nor an MNC are received as determined in step 319, the controller 101 sets up an interface of the mobile terminal with a pre-defined default value and default settings in step 321. In this case, the controller 101 sets the data communication function, the e-mail function, the network setup function of the mobile terminal, and other functions provided by the mobile terminal, and sets up content with their associated default values.

FIG. 3 illustrates a process of setting up an interface in a mobile terminal according to the exemplary embodiment of the present invention.

Referring to FIG. 3 in greater detail, in step 301, the mobile terminal stores an interface setup application in advance. In step 303, the mobile terminal determines whether the mobile terminal itself is powered on.

In step 305, the mobile terminal determines whether a SIM card is in the mobile terminal, for example, in the SIM card unit 109. If a SIM card is present in step 305, the mobile terminal proceeds to step 307. Otherwise, if no SIM card is present, the mobile terminal proceeds to step 317.

In step 307, the mobile terminal checks an MCC and an MNC that are stored in the SIM card. In step 309, the mobile terminal executes the interface setup application 201.

In step 311, the mobile terminal installs and sets up an interface in the mobile terminal by applying the MCC and the MNC to the executed interface setup application. In particular, the mobile terminal searches for customized data corresponding to the MCC and the MNC from among a plurality of pieces of customized data and sets up an interface of the mobile terminal based on the searched customized data.

In this case, the mobile terminal sets a data communication function, an e-mail function, a network setup function of the mobile terminal, and other functions provided by the mobile terminal as required by a specific operator based on an APN profile, e-mail setting information, network lock setting information, and function enabling setting information that are included in the searched customized data. In addition, the mobile terminal updates and stores content of the mobile terminal as required by or selected by the specific operator based on bookmark information, a homepage address, power-on/off images, a wallpaper, a ringtone, applications, menu setting information, and widgets that are included in the searched customized data.

If setup-related link information is included in the searched customized data, the mobile terminal may access an external server based on the link information to receive any remaining customized data from the external server, and may set up an interface of the mobile terminal based on the searched customized data and the received remaining customized data.

In addition, if there is an error in specific customized data, the mobile terminal may access the external server based on the link information to update the interface setup application, may receive the specific customized data from the external server, and may update the interface setup application based on the received specific customized data.

In this way, the mobile terminal can quickly set up the interface by updating the interface setup application when there is an error in customized data, without the manufacturer's need to create a new interface setup application.

In step 313, the mobile terminal ends and deletes the executed interface setup application. In step 315, the mobile terminal reboots itself to apply and implement the set interface of the mobile terminal.

In this manner, the interface setup application is deleted after its setup, contributing to an increase in memory utilization of the mobile terminal.

Referring back to step 317, the mobile terminal sends a request message for requesting an MCC and an MNC of the mobile terminal to the external server. In step 319, the mobile terminal determines whether an MCC and an MNC are received in response to the request message. If an MCC and an MNC are received, the mobile terminal proceeds to step 309 and performs steps 309-315. Otherwise, if neither an MCC nor an MNC are received, the mobile terminal proceeds to step 321.

In step 321, the mobile terminal sets up an interface of the mobile terminal with a pre-defined default value and default settings. In this case, the mobile terminal sets the data communication function, the e-mail function, the network setup function of the mobile terminal and other functions provided by the mobile terminal, and sets the content with their associated default values.

As a result, according to the present invention, the mobile terminal's user, instead of the mobile terminal's manufacturer, may set up an interface of the mobile terminal, so the user may re-set the mobile terminal to have an interface for other countries/operators, using the interface setup application even though the mobile terminal was set to have an interface for a specific country/operator, thus making it possible for the user to use the mobile terminal in other countries and regions or other operator's network.

As is apparent from the foregoing description, the present invention allows a mobile terminal to set up its interface using an interface setup application, without the manufacturer's need to create different dedicated software unique to each of or a group of countries/operators.

In addition, the present invention allows a mobile terminal to set up its interface using an updatable interface setup application, without the manufacturer's need to newly create customized software despite the occurrence of an error in its customized data.

Moreover, the present invention allows a mobile terminal to delete an interface setup application after setting up its interface, contributing to an increase in memory utilization of the mobile terminal.

Besides, the present invention allows a mobile terminal to set up its interface using an interface setup application, making it possible for its user to use the mobile terminal in other countries or regions and/or other operator's networks.

The above-described apparatus and methods according to the present invention can be implemented in hardware, firmware or via the execution of software or computer code that can be stored in a recording medium such as a CD ROM, a RAM, a ROM, a floppy disk, DVDs, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program may be electronically transferred through any media such as communication signals transmitted by wire/wireless connections, and their equivalents.

While the invention has been shown and described with reference to certain exemplary embodiments such as a mobile communication terminal, it will be understood by those skilled in the art that various changes in form and details may be made therein without departing from the spirit and scope of the invention as defined by the appended claims and their equivalents.

For example, although an MCC and an MNC, in the exemplary embodiment of the present invention, can be received from a SIM card or an external server, an MCC and an MNC may be input to a mobile terminal by a user of the mobile terminal, and an interface of the mobile terminal may be set up based on customized data corresponding to the input MCC and MNC.

What is claimed is:

1. An apparatus comprising:
   a display; and
   a controller operatively coupled with the display, the controller configured to:
   obtain country information and network information from a Subscriber Identity Module (SIM) card operatively coupled to the controller;
   select an interface for a user from a plurality of interfaces based at least in part on a determination that the interface corresponds to the country information and the network information; and
   present the interface via the display after installing the selected interface for a user.

2. The apparatus of claim 1, wherein the controller is configured to:
   install one or ore applications as the interface.

3. The apparatus of claim 2, wherein the controller is configured to:
   obtain the one or more applications from an electronic device external to the apparatus based at least in part on the country information and the network information.

4. The apparatus of claim 3, wherein the electronic device comprises a server corresponding to a service provider associated with the country information and the network information.

5. The apparatus of claim 2, wherein the one or more applications comprise an application corresponding to a service provider associated with the country information and the network information.

6. The apparatus of claim 2, further comprising memory, wherein the controller is configured to:
   obtain the one or more applications from the memory.

7. The apparatus of claim 2, wherein the controller is configured to:
   obtain the one or more applications from the SIM card operatively coupled with the controller.

8. The apparatus of claim 1, wherein the controller is configured to:
   obtain the country information and the network information from at least one of the user, an electronic device external to the apparatus, or the SIM card operatively coupled with the controller.

9. The apparatus of claim 1, wherein the controller is configured to:
   present, as the interface, at least one of an e-mail setting, a bookmark, a web page, a power-on image, a power-off image, a wallpaper, a ringtone, a menu setting, or a widget.

10. The apparatus of claim 1, wherein the controller is configured to:
    present, as the interface, a specified function corresponding to a specified service provider associated with the country information and the network information.

11. The apparatus of claim 1, wherein the country information and the network information comprises at least one of a mobile network code or a mobile country code.

12. The apparatus of claim 1, further comprising:
    detecting whether the SIM card is operatively coupled to the controller;
    obtaining country information and network information from the SIM card in response to detecting that the SIM card is operatively coupled to the controller; and
    transmitting a request to an external server for the country information and the network information if the SIM card is not operatively coupled to the controller.

13. The apparatus of claim 12, further comprising:
    in response to detecting that the country information and the network information are not received from the external server, initializing a setup application to implement a default interface for the apparatus from memory.

14. A method comprising:
    obtaining, at an electronic device, country information and network information from a Subscriber Identity Module (SIM) card installed to the electronic device;
    selecting, using one or more processors operatively coupled with the electronic device, an interface for a user from a plurality of interfaces based at least in part on a determination that the interface corresponds to the country information and the network information; and presenting the interface via a display operatively coupled with the electronic device.

15. The method of claim 14, wherein the selecting comprises:
    selecting, as the interface, a first interface from the plurality of interfaces based at least in part on a determination that the country information and the network information corresponds to at least one of a first country, a first region, or a first network; and
    selecting, as the interface, a second interface from the plurality of interfaces based at least in part on a determination that the country information and the network information corresponds to at least one of a second country, a second region, or a second network.

16. The method of claim 14, wherein the presenting comprises:
    installing one or more applications as the interface.

17. The method of claim 16, wherein the installing comprises:
    obtaining the one or more applications from another electronic device external to the electronic device based at least in part on the country information and the network information.

18. The method of claim 17, wherein the another electronic device comprises a server corresponding to a service provider associated with the country information and the network information.

19. The method of claim 16, wherein the one or more applications comprise an application corresponding to a service provider associated with the country information and the network information.

20. An apparatus comprising:
    a processor; and
    memory operatively coupled with the processor, the memory storing instructions that, when executed by the processor, cause the apparatus to:
        obtain country information and network information from a Subscriber Identity Module (SIM) card installed to the apparatus;
        select an interface for a user from a plurality of interfaces based at least in part on a determination that the interface corresponds to the country information and the network information; and
        present the interface via a display operatively coupled with the apparatus.

21. The apparatus of claim 20, wherein the instructions comprise one or more instructions that, when executed by the processor, cause the apparatus to:
    install, as the interface, one or more applications obtained from an electronic device external to the apparatus based at least in part on the country information and the network information.

22. The apparatus of claim 20, wherein the instructions comprise one or more instructions that, when executed by the processor, cause the apparatus to:
    present, as the interface, at least one of an e-mail setting, a bookmark, a web page, a power-on image, a power-off image, a wallpaper, a ringtone, a menu setting, or a widget.

* * * * *